Patented May 7, 1940

2,199,585

UNITED STATES PATENT OFFICE 2,199,585

PRODUCTION OF OXYGENATED ORGANIC COMPOUNDS

William Arthur Bone and Dudley Maurice Newitt, South Kensington, London, England, assignors to Imperial Chemical Industries Limited, a corporation of Great Britain No Drawing. Application July 13, 1936, Serial No. 90,442. In Great Britain July 15, 1935

15 Claims. (Cl. 260—599)

This invention relates to the production of oxygenated organic compounds, such as phenol, benzyl alcohol, benzaldehyde and benzoic acid, by the partial oxidation of aromatic hydrocarbons, in particular benzene and toluene.

We have found that by mixing benzene in vapor form with a limited amount of oxygen or of an oxygen-containing gas, e. g. air, and exposing the mixture to certain conditions of temperature and pressure, the benzene is partly converted into phenol, together with minor quantities of aliphatic acids and aldehydes and some oxides of carbon. Toluene, under similar conditions, yields benzyl alcohol, benzaldehyde, benzoic acid, also some dihydroxy toluene, the relative quantities of these products depending upon the reaction conditions. Generally all of the oxygen in the initial mixture is used up in the reaction, a proportion of the oxygen appearing in the reaction products in the form of water.

The reaction temperatures range from about 200° C. to about 400° C. and a pressure of at least 10 atmospheres is required. Generally pressures between 10 and 50 atmospheres are employed, as there appears to be no substantial advantage in the use of pressures over 50 atmospheres. In some cases, e. g. with toluene, the pressure is limited by the vapor pressure of the hydrocarbon when working at temperatures below the critical temperature.

The reaction may be carried out in closed vessels or in apparatus designed to allow the gas mixture to flow through a heated reaction zone, and preferably to be recirculated after the removal of the condensible reaction products and the addition of further quantities of oxygen or oxygen-containing gas. The higher the reaction temperature the shorter is the time required for the reaction to take place. Careful control of the reaction temperature is necessary, as the reaction is exothermic and if the temperature rises too far the desired reaction products may not be formed, or if formed may be partly degraded into further oxidation products such as maleic acid and oxides of carbon. The presence of an inert gas facilitates control of the reaction temperature.

In the case of a flow process the reaction temperature can be conveniently controlled by regulating the speed of passage of the mixture through the reaction zone. Space velocities of at least 5 are generally employed and in some cases 40-50. The space velocity is the number of volumes of gas mixture, reckoned at normal temperature and pressure, which pass through one volume of the reaction zone in one minute.

Apart from temperature, the chief factor influencing the nature of the reaction products of a given hydrocarbon is the composition of the initial reaction mixture. This is illustrated by the following table, which gives the conditions most favorable for the oxidation of toluene to benzyl alcohol, benzaldehyde and benzoic acid respectively. The pressure in all cases was over 20 atmospheres.

| Main product | Volume percent composition of initial gas mixture | Temperature °C | Space velocity |
|---|---|---|---|
| Benzyl alcohol | 84% toluene<br>16% air | 340–350 | Over 20. |
| Benzaldehyde | 75–80% toluene<br>25–20% air | 320–340 | Over 20. |
| Benzoic acid | 50% toluene<br>50% air | 275–300 | 4–20. |

In the case of benzene the following results were obtained in closed vessels, the partial pressure of benzene being 20 atmospheres and the reaction temperature 312° C. in each case.

| Molecular ratio $C_6H_6/O_2$ | Percent. of $C_6H_6$ used up converted to phenol |
|---|---|
| 1.9 | 12.8 |
| 3.7 | 37.7 |
| 9.9 | 24.9 |
| 20.0 | 38.3 |

Thus a larger excess of hydrocarbon is required for the production of a high yield of phenol.

Other hydrocarbons which may be treated in accordance with the present invention include ethyl benzene, the xylenes, the trimethylbenzenes, cumene and cymene.

The nature of the reaction products may also be influenced by working in the presence of catalysts. Solid catalysts such as the usual oxidation catalysts, e. g. vanadium pentoxide, appear to favor the production of acids, e. g. maleic acid from benzene and benzoic acid from toluene. Gaseous catalysts, e. g. hydroquinone, have a similar effect. Generally, however, there is no advantage to be gained by employing catalysts.

The method of separating the reaction products from the gas mixture will depend upon the nature of the product. Generally condensation will be most convenient, with subsequent separation of the reaction products from the unchanged hydrocarbon and revaporisation of the latter (with the aid of the sensible heat of the gases leaving the reaction zone) for return to the process. Phenol may be separated from the reaction gases without condensing the benzene by passing them over excess of hot caustic soda, the resulting sodium phenate being worked up by standard methods.

If desired the oxidation may be performed in two or more stages, with or without intermediate removal of the reaction products, oxygen or an oxygen-containing gas being added between the stages to make up for the oxygen consumed in the preceding stage. It is also possible to arrange the conditions in the various stages to obtain different main reaction products in each stage, e. g. by varying the oxygen concentration and/or the temperature. It is advantageous to make chiefly a primary oxidation product in the first stage and chiefly a secondary oxidation product in the second and so on, when the separation of the reaction products after each stage need not be complete since any uncondensed primary oxidation product for example is converted into secondary oxidation product in the second stage. In the final stage a normally solid and easily separated product is preferably made.

*Example 1*

A mixture containing, by volume, 75–80% of benzene and 25–20% of air, was passed under a pressure of 50 atmospheres and at a space velocity of over 10 through a reaction zone maintained at a temperature of 365–375° C. All of the oxygen was used up and the quantities of products, in percentages of the benzene oxidised, were as follows:

| | Per cent |
|---|---|
| Phenol | 53.5 |
| Aliphatic acids and aldehydes | 4.2 |
| Oxides of carbon | 30.0 |
| Unidentified balance | 12.3 |

The percentage distribution of oxygen in the products was:

| | |
|---|---|
| Phenol | 10.6 |
| Quinone and hydroquinone | trace |
| Formaldehyde | 3.0 |
| Maleic acid | 2.8 |
| Carbon monoxide | 26.2 |
| Carbon dioxide | 29.8 |
| Water | 27.6 |
| | 100 |

Thus 100 parts of benzene, on reaction, will give:

| | Parts |
|---|---|
| Phenol | 62.3 |
| Quinone and hydroquinone | trace |
| Maleic acid | 5.08 |
| Formaldehyde | 5.62 |
| Carbon monoxide | 45.8 |
| Carbon dioxide | 41.0 |
| Water | 31.0 |

*Example 2*

A mixture of benzene vapor and air containing benzene and oxygen in the molecular ratio of 5:1 was preheated to 350° C. and passed through an empty stainless steel tube 2′ 6″ long and 1¼″ in internal diameter, mounted in an electric furnace and heated to 373° C. The mixture was under a pressure of 50 atmospheres and the velocity was eight litres per hour per square centimetre (volume calculated at N. T. P.). The exit gases were cooled under pressure and a lemon yellow mobile condensate was obtained from which the phenol was obtained by extraction with aqueous caustic soda. The yield of phenol was 41.7% of the benzene converted, the concentration of phenol in the residual benzene being 10.7%.

*Example 3*

A mixture of toluene vapor and air containing toluene and oxygen in the molecular ratio of 30:1 was heated to 337° C. in a 500 c. c. steel autoclave, the total initial pressure at this temperature being 35 atmospheres. The following products were obtained after cooling the contents of the autoclave:

| | Per cent |
|---|---|
| Benzyl alcohol | 6.2 |
| Benzaldehyde | 50.6 |
| Benzoic acid | 16.7 |
| 2:4 dihydroxy toluene | 9.9 |
| Carbon monoxide | 5.4 |
| Carbon dioxide | 5.2 |

The amounts of products are expressed as percentages of the carbon of the toluene oxidised.

If the temperature is raised above 337° C. the yield of benzylalcohol is increased at the expense of benzaldehyde and benzoic acid, but above about 390° C. the yields fall off owing to increased formation of oxides of carbon.

*Example 4*

A mixture of ethyl benzene vapor and air containing ethyl benzene and oxygen in the molecular ratio of 40:3 was heated to 322° C. in a 500 c. c. steel autoclave, the total initial pressure at this temperature being 27.5 atmospheres. The following products were obtained after cooling the contents of the autoclave:

| | Per cent |
|---|---|
| Benzaldehyde | 54.0 |
| Acetophenone | 13.4 |
| 2:4 dihydroxy ethyl benzene | 10.3 |
| Phenyl methyl carbinol | 8.9 |
| Benzoic acid | 6.4 |

The amounts of products are expressed as percentages of the carbon of the ethyl benzene oxidized.

*Example 5*

In the first stage, toluene and oxygen in the molecular ratio of 26:1 are passed through a zone maintained at 340–350° C., whereby some benzyl alcohol is formed. This is separated by means of a cold catch pot maintained at such a temperature that substantially pure benzyl alcohol separates as the liquid phase. A small proportion of the yield of this substance passes to the next stage.

The gaseous mixture leaving the cold catch pot has its toluene/oxygen ratio adjusted to 15/1 and is passed, in heat interchange with the products of the previous stage, to a second reaction zone maintained at 230–340° C. Benzaldehyde is formed and is separated in a cold catch pot maintained at a temperature such that substantially pure benzaldehyde separates as the liquid phase.

The gaseous mixture leaving the cold catch pot has its toluene/oxygen ratio adjusted to 1/1 and is passed, in heat interchange with the products of the previous stage to a third reaction zone maintained at 275–300° C. Benzoic acid is formed, which, being a solid at temperatures above the boiling point of toluene, is very readily separated from the latter. The toluene is then passed back to the feed to the first stage.

We claim:

1. A process for the production of oxygenated organic compounds by the partial oxidation of aromatic hydrocarbons which comprises reacting an aromatic hydrocarbon with oxygen in a reaction space void of catalyst, in the vapor phase, at a temperature of from about 200 to about 400° C., and under a pressure of at least 10 atmospheres, the proportions of hydrocarbon present being at least the molecular equivalent of the oxygen present.

2. A process according to claim 1 in which the hydrocarbon contains at least one side chain.

3. A process as claimed in claim 1, in which an inert gas is included in the reaction mixture.

4. The process of producing phenol which comprises passing a mixture of benzene vapor and air, containing by volume 75-80% of benzene and 25-20% of air, under a pressure of about 50 atmospheres and at a space velocity of over 10, through a reaction zone void of catalyst and maintained at a temperature of 365-375° C.

5. The process of producing phenol which comprises passing a mixture of benzene vapor and air containing benzene and oxygen in at least the molecular ratio of 5:1, under a pressure of at least 10 atmospheres, through a reaction zone void of catalyst and maintained at a temperature of 300-400° C.

6. The process of producing benzaldehyde which comprises passing a mixture of toluene vapor and air in the proportions, by volume of 75-80% toluene to 25-20% air, under a pressure of at least 20 atmospheres and at a space velocity of over 20, through a reaction zone void of catalyst and maintained at a temperature of 320-340° C.

7. The process of producing benzaldehyde which comprises passing a mixture of ethyl benzene vapor and air containing ethyl benzene and oxygen in the molecular ratio of at least 10:1, under a pressure of at least 20 atmospheres, and at a space velocity of at least 20, through a reaction zone void of catalyst and maintained at a temperature of 300-350° C.

8. A process for the production of oxygenated organic compounds by the partial oxidation of aromatic hydrocarbons, which comprises reacting an aromatic hydrocarbon with oxygen in the vapor phase and under a pressure of at least 10 atmospheres, the proportion of hydrocarbon present being at least the molecular equivalent of the oxygen present, an inert gas being included in the reaction mixture and said reaction mixture being passed through a heated reaction space void of catalyst at a space velocity of at least 5.

9. A process for the production of oxygenated organic compounds by the partial oxidation of aromatic hydrocarbons, which comprises subjecting a mixture containing a vaporized aromatic hydrocarbon and free oxygen to a temperature of 200-400° C., while under a pressure of at least 10 atmospheres, in a heated reaction space void of catalyst, the proportion of hydrocarbon present being at least the molcular equivalent of the oxygen present at a space velocity of at least 5.

10. A process for the production of oxygenated organic compounds by the partial oxidation of aromatic hydrocarbons, which comprises reacting an aromatic hydrocarbon with oxygen in the vapor phase and under a pressure of at least 10 atmospheres, the proportion of hydrocarbon present being at least the molecular equivalent of the oxygen present, an inert gas being included in the reaction mixture and said reaction mixture being passed through a heated reaction space void of catalyst, the oxidation being performed in at least two stages, with or without intermediate removal of the reaction products, oxygen or an oxygen-containing gas being added between the stages to make up for the oxygen consumed in the preceding stage.

11. A process for the production of oxygenated organic compounds by the partial oxidation of aromatic hydrocarbons, which comprises reacting an aromatic hydrocarbon with oxygen in the vapor phase and under a pressure of at least 10 atmospheres, the proportion of hydrocarbon present being at least the molecular equivalent of the oxygen present, an inert gas being included in the reaction mixture and said reaction mixture being passed through a heated reaction space void of catalyst at a space velocity of at least 5, the oxidation being performed in at least two stages, with or without intermediate removal of the reaction products, oxygen or an oxygen-containing gas being added between the stages to make up for the oxygen consumed in the preceding stage.

12. A process as claimed in claim 1 in which the oxidation, performed in at least two stages, with or without intermediate removal of the reaction products, oxygen or an oxygen-containing gas being added between the stages to make up for the the oxygen consumed in the preceding stage.

13. A process as claimed in claim 1 in which the space velocity of the mixture is at least 5.

14. A process as claimed in claim 1 in which the oxidation is performed in at least two stages, oxygen-containing gas being added between the stages to make up for the oxygen consumed in the preceding stage, and the conditions in the various stages being arranged to obtain different main reaction products in each stage by varying the oxygen concentration and temperature.

15. A process as claimed in claim 1 in which the oxidation is performed in at least two stages, and oxygen-containing gas being added between the stages to make up for the oxygen consumed in the preceding stage and in which the primary oxidation product is chiefly made in the first stage, and a secondary oxidation product chiefly in the second stage, the final oxidation product chiefly made in the last stage being preferably solid at normal temperatures.

WILLIAM ARTHUR BONE.
DUDLEY MAURICE NEWITT.